(12) United States Patent
Shariat et al.

(10) Patent No.: US 11,937,124 B2
(45) Date of Patent: Mar. 19, 2024

(54) METHOD AND APPARATUS FOR NORMALISING DATA IN ARTIFICIAL INTELLIGENCE SYSTEM

(71) Applicant: Samsung Electronics Co., Ltd., Suwon-si (KR)

(72) Inventors: Mehrdad Shariat, Staines (GB); Yue Wang, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 17/250,807

(22) PCT Filed: Sep. 6, 2019

(86) PCT No.: PCT/KR2019/011523
§ 371 (c)(1),
(2) Date: Mar. 4, 2021

(87) PCT Pub. No.: WO2020/050671
PCT Pub. Date: Mar. 12, 2020

(65) Prior Publication Data
US 2021/0314813 A1    Oct. 7, 2021

(30) Foreign Application Priority Data

Sep. 6, 2018    (GB) ..................... 1814536

(51) Int. Cl.
*H04B 7/00*    (2006.01)
*G06N 3/08*    (2023.01)
(Continued)

(52) U.S. Cl.
CPC ............. *H04W 28/06* (2013.01); *G06N 3/08* (2013.01); *H04W 24/08* (2013.01)

(58) Field of Classification Search
CPC ........ H04W 28/06; H04W 24/08; G06N 3/08; H04L 41/16; G06F 16/2477; G06F 16/254; G06F 16/215; G06F 16/258
(Continued)

(56) References Cited

U.S. PATENT DOCUMENTS 7,164,117 B2 *   1/2007   Breed .................... B60N 2/002
                                                                250/221
7,421,660 B2 *   9/2008   Charnock ............. G06F 16/358
                                                                715/753
(Continued)

FOREIGN PATENT DOCUMENTS

KR    10-2018-0090537 A    8/2018
KR    10-2018-0097895 A    9/2018
WO    2018039102 A1    3/2018

OTHER PUBLICATIONS

International Search Report and Written Opinion of the International Searching Authority for International Application No. PCT/KR2019/011523, dated Dec. 19, 2019, 10 pages.
(Continued)

*Primary Examiner* — Amancio Gonzalez

(57) ABSTRACT

The present application provides a method of normalising data, which includes the following. The AI engine receives data of different domains of an assisted system, normalises the data of the different domains into a unified format, based on at least one normalisation method corresponding the each of the different domains and provides the normalised data to an other functional block in the AI engine.

15 Claims, 5 Drawing Sheets

(51) Int. Cl.
*H04W 24/08* (2009.01)
*H04W 28/06* (2009.01)

(58) Field of Classification Search
USPC .......................................................... 370/310
See application file for complete search history.

(56) References Cited

U.S. PATENT DOCUMENTS

| | | | | |
|---|---|---|---|---|
| 7,512,570 | B2* | 3/2009 | Chang | G06N 5/02 706/11 |
| 7,765,172 | B2* | 7/2010 | Chang | G06N 5/02 706/11 |
| 7,801,837 | B2* | 9/2010 | Chang | G06N 5/02 706/16 |
| 8,468,244 | B2* | 6/2013 | Redlich | G06Q 50/18 715/255 |
| 10,185,917 | B2 | 1/2019 | Greystoke | G06Q 30/0619 |
| 10,437,889 | B2* | 10/2019 | Greystoke | G06F 16/951 |
| 11,157,505 | B2* | 10/2021 | Gutiérrez | G06F 16/137 |
| 2003/0176931 | A1* | 9/2003 | Pednault | G06N 7/01 700/44 |
| 2007/0282768 | A1* | 12/2007 | Chang | G06N 5/02 706/16 |
| 2010/0250497 | A1* | 9/2010 | Redlich | H04L 63/105 707/661 |
| 2015/0242930 | A1* | 8/2015 | Greystoke | G06Q 30/0631 705/26.7 |
| 2017/0011444 | A1* | 1/2017 | Greystoke | G06Q 30/0619 |
| 2017/0091849 | A1* | 3/2017 | Greystoke | G06F 16/951 |
| 2017/0091883 | A1* | 3/2017 | Greystoke | G06Q 50/14 |
| 2019/0164087 | A1* | 5/2019 | Ghibril | G06N 5/02 |
| 2020/0013029 | A1* | 1/2020 | Gu | G06Q 20/14 |
| 2020/0126664 | A1* | 4/2020 | Sato | G16H 50/70 |
| 2021/0151306 | A1* | 5/2021 | Jo | H01J 49/0418 |

OTHER PUBLICATIONS

Sukmana, et al., "Unified Logging System for Monitoring Multiple Cloud Storage Providers in Cloud Storage Broker," 2018 International Conference on Information Networking (ICOIN), IEEE, Jan. 10-12, 2018, 7 pages.

* cited by examiner

METHOD AND APPARATUS FOR NORMALISING DATA IN ARTIFICIAL INTELLIGENCE SYSTEM

CROSS-REFERENCE TO RELATED APPLICATIONS

This application is a 371 National Stage of International Application No. PCT/KR2019/011523 filed Sep. 6, 2019, which claims priority to United Kingdom Patent Application No. GB 1814536.7 filed Sep. 6, 2018, the disclosures of which are herein incorporated by reference in their entirety.

BACKGROUND

1. Field

The present invention relates to improvements in the field of Artificial Intelligence (AI) in the control and operation of, in particular, telecommunication networks. However, the techniques and methods disclosed herein may be applied to other complex systems and networks and the illustration using a telecommunication network should be considered exemplary only.

2. Description of Related Art

As data traffic increases in the form of an exponential function with the development of computer technology, artificial intelligence (AI) has become an important trend to lead future innovation. AI is a way to mimic the way that people think, and thus AI is infinitely applicable to almost all industries.

Representative technologies of AI include pattern recognition, machine learning, expert systems, neural networks, natural language processing, etc. AI has been developed with the aim of causing devices to make reasonable decisions through machine learning and artificial neural network technologies, which enable a probabilistic increase in the recognition rate of big data through self learning.

The use of AI in current and emerging telecommunication networks has been envisaged as a major transformation in the communication networks. AI techniques, and the resulting context-aware policies, when applied to adjust network functions and resources based on changes in user needs, environmental conditions and business goals, are expected to provide significant improvements in the experience of users (in terms of Quality of Experience, QoE) as well as the operators (in terms of capital expenditure and operational costs).

SUMMARY

Such an intelligence based system, data is gathered from different domains. There is presently no known protocol for providing any form of normalisation and there are is a need for a solution to process the data of different domains.

The present application provides a method of normalising data, which includes the receiving data of different domains of an assisted system, normalising the data of the different domains into a unified format, based on at least one normalisation method corresponding the each of the different domains, and providing the normalised data to an other functional block in the AI engine.

BRIEF DESCRIPTION OF THE DRAWINGS

For a better understanding of the invention, and to show how embodiments of the same may be carried into effect, reference will now be made, by way of example only, to the accompanying diagrammatic drawings in which.

Figure 1:
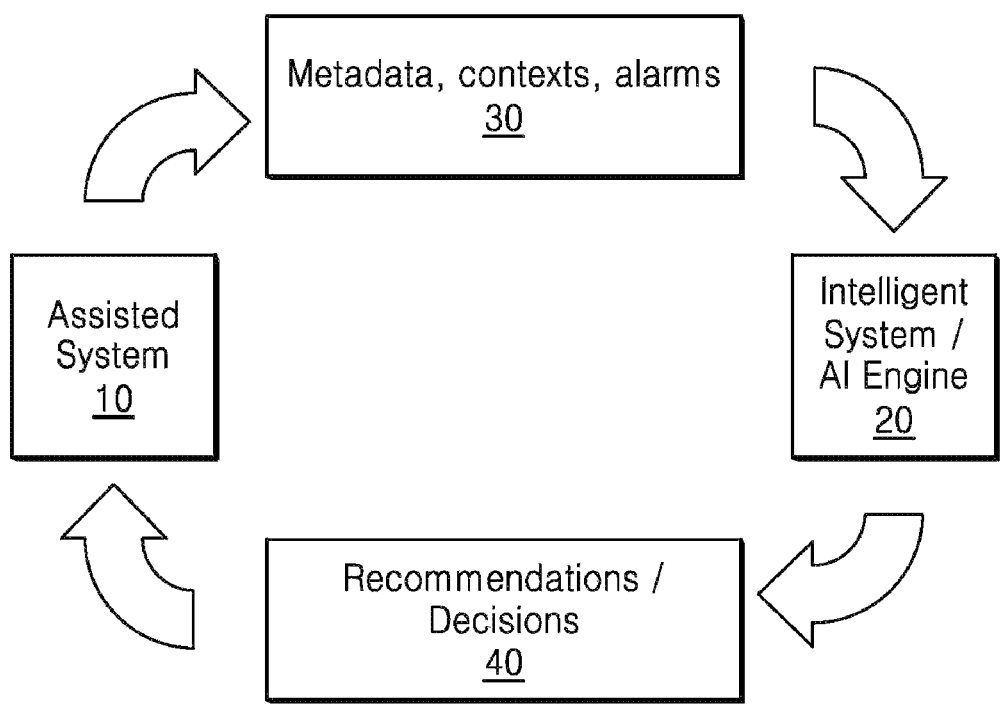
FIG. 1 shows interactions between an assisted system and an intelligent system, according to an embodiment of the present invention.

Embodiments of the present invention will now be described under several headings for ease of explanation.

DETAILED DESCRIPTION

According to the present invention there is provided an apparatus and method as set forth in the appended claims. Other features of the invention will be apparent from the dependent claims, and the description which follows.

According to a first aspect of the present invention, there is provided a method of normalising data for use by an intelligent system performs intelligent tasks for an assisted system, comprising the steps of: the intelligent system receiving data from different domains of the assisted system in the form of at least one of metadata, contexts and alarms; the intelligent system normalising the received data to provide a unified format of the data, for subsequent functional blocks of the intelligent system, including addressing different time cycles of sampling in the different domains; the intelligent system making recommendations or decision and transmitting the same to the assisted system.

Preferably, the step of normalising comprises one or more: of padding data, discarding data, interpolating data; generating first or higher order statistics.

Preferably, the step of normalising further comprises the step of pre-processing the received data so that is able to be processed by the intelligent system.

Preferably, the method of normalisation comprises the use of a normalised data format to facilitate communication between different functional blocks of the intelligent system.

Preferably, the normalised data format comprises a plurality of fields including: a time stamp, identifying a time at which a sample is generated; a service, indicating a particular service from which the sample has been derived; a source, indicating a particular source of the sample; a destination, indicating a destination to which the data should be transmitted; action requested, indicating an action which the assisted system wishes the intelligent system to perform; and the data, indicating the actual data collected by the intelligent system.

Preferably, the method of normalisation further comprises learning and inferencing of data from a first domain, extracting information from said data, forming said information into a message using the normalised data format and passing the message to a second domain, where the data comprises therein is combined with data from the second domain according to an instruction included in the 'action requested' field.

Preferably, the 'action requested field' is one of a plurality of possible actions.

Preferably, the intelligent system requests the assisted system to expose additional data and/or APIs.

Preferably, the assisted system is a telecommunication system.

Preferably, the different domains in the telecommunication network correspond to different functional parts of the network.

Preferably, the different functional parts comprise one or more of: Radio Access Network, RAN; Transport; and Core.

According to a second aspect of the present invention, there is provided a method of operating an intelligent system, whereby the intelligent system performs intelligent tasks for an assisted system, whereby the assisted system transmits a request to the intelligent system to perform an action whereby the requested action is one of a plurality of possible actions.

According to a third aspect of the invention, there is provided a system and/or apparatus arranged to perform the method of the first or second aspect.

By means of an embodiment of the present invention, different intelligent actions can be requested, depending on the particular needs of the assisted system. The use of normalised data and/or a unified data structure assists in this regard.

According to a fourth aspect of the present invention, there is provided a method of normalising data, by an AI (artificial intelligent) engine, the method comprising receiving data of different domains of an assisted system, normalising the data of the different domains into a unified format, based on at least one normalisation method corresponding the each of the different domains, and providing the normalised data to an other functional block in the AI engine.

Preferably, the normalising comprises: learning and inferring data of a specific domain; and determining information to be passed for the normalising, from the data of the specific domain.

Preferably, the normalising comprises performing a post processing of the data from different domains, and the post processing includes a correlation function.

Preferably, the normalising comprises performing at least one of up-sampling the data, down-sampling the data or interpolating the data.

Preferably, the data is received based on a task required to be performed at the AI engine and Preferably, the method further comprises receiving a request of performing the task from the assist system, in response the tasks being defined at the assist system.

Preferably, the each of the different domains has at least one a specific API or a specific time cycle.

According to a fifth aspect of the present invention, there is provided a transceiver; and a processor coupled with the transceiver and configured to: control the transceiver to receive data of different domains of an assisted system, normalise the data of the different domains into a unified format, based on at least one normalisation method corresponding the each of the different domains, and provide the normalised data to an other functional block in the AI engine.

In order to make the purpose, the technical scheme and advantages of the present disclosure more clearly, the present disclosure is further described in detail with reference to the accompanying embodiments and drawings.

Such an intelligence based system, for example of the type being specified by the Experiential Networked Intelligence (ENI) industry standardization group of the European Telecommunication Standards Institute (ETSI) hereafter referred as an 'AI engine' or an 'intelligent system', can assist the current and emerging networks, by learning from accumulated data, and/or making decisions related to the existing system. In the following description, the system that is being assisted by the AI engine is referred to as the 'assisted system', and is illustrated in FIG. 1. The term 'AI engine' and 'intelligent system' are used interchangeably hereafter.

FIG. 1 shows a general schematic overview, illustrating the inter-relation between the assisted system 10 and the intelligent system or AI engine 20. The AI engine 20 accumulates metadata, contexts and alarms 30 from the assisted system 10, processes that information and returns recommendation and/or decisions 40 to the assisted system 10. The entire process is a closed loop and iterative.

The aforementioned accumulated data may be gathered from different sources and different parts of the network. For example, it is envisaged that the AI engine 20 will need to interact with existing architectures, e.g., Network Functions Visualisation Management and Orgnaisation (NFV MANO), and with open source Fora, e.g. Open Network and Automation Platform (ONAP).

The AI engine 20 may also interact with different layers and domains of the assisted system 10, via their exposed Application Programming Interfaces (APIs). The data gathered by the AI engine 20 needs to be interpreted and understood by the AI engine 20 in a unified form and format—using a so called 'data normalisation' process. In this sense, 'form' can refer to e.g. knowledge obtained or experience learned. Data normalisation can happen inside the AI engine 20, as a preliminary functional block in the AI engine 20, to facilitate the other functionalities (e.g., generation of the policies) also carried out in the AI engine 20.

There is presently no known protocol for providing any form of normalisation and there are is a need for a solution to the problems associated therewith.

In more detail, data normalisation is a process associated with ingesting different data from various data sources, and then 'normalising' said data to a common format for processing by the other functional blocks of the ENI (experiential networked intelligence) system. An ENI system consists of common data analytics and processing functional blocks. Data normalisation facilitates the use and reuse of these functional blocks in an ENI system, enables the modularisation and generalisation of the design of the other functional blocks, as well as increasing vendor neutrality i.e. allowing devices from different suppliers to interoperate effectively.

It is understood that although an ENI system is used as an example of an intelligent system, the same principle applies to other AI engines and intelligent systems developed in other standardisation bodies (e.g., ITU and 3GPP), for the purpose of assisting the existing system with an intelligent 'plug-in'.

Communication networks follow a layered protocol architecture. It is envisaged that such a layered network architecture may co-exist with other emerging architectures for the foreseeable future, and their interaction with an AI engine is a problem which needs to be addressed. In such a layered network, each domain (e.g. Radio Access Network, RAN, Transport, Core and beyond) has its specific functions and services to support adjacent domains. Each domain (based on the embedding layers within) has specific APIs and runs on its specific time-cycle.

Applying AI techniques is challenging in such an architecture, in particular for end-to-end network problems where cross domain intelligence is needed, due to the heterogeneity of problem space across the domains (in terms of type of data precision, privacy, integrity of analytics and supported data formats), in addition to the different time-cycles in which the data is gathered (or processed).

Embodiments of the present invention aim to address such problems in the prior art, as well as other problems not explicitly mentioned herein.

An intelligent system may be distributed or centralised.

In the distributed case, the AI engines can be allocated in different domains of the network, and localised intelligent tasks may be performed. The distributed AI engines may communicate and cooperate with each other to accomplish a task that requires knowledge and experience learnt from different domains.

In the centralised case, the AI engine locates at the 'centre' of the network, and performs all intelligent related tasks for the network. The 'centre' of the network need not correspond to any particular network entity, as long as it itself is not distributed.

Although a few preferred embodiments of the present invention have been shown and described, it will be appreciated by those skilled in the art that various changes and modifications might be made without departing from the scope of the invention, as defined in the appended claims.

Normalisation of Learning Data

The time cycles associated with different domains in the network are a problem when it comes to normalising data across these domains. Time cycle in this context refers to the time period over which a certain degree of activity is to be expected. For instance, generally RAN level functions and services run on a faster cycle compared with TN or Core functions, where activity tends to happen over a longer time period.

This implies that if an AI Engine (e.g. a Machine Learning, ML, Engine) collects its learning samples for a service at a domain with faster dynamics (e.g. RAN level), more learning data with a higher time granularity can be gathered in a given timeframe versus other slower-cycle domains. This can lead to a mismatch in sheer quantity of data derived from different domains in a given timeframe.

Figure 2:
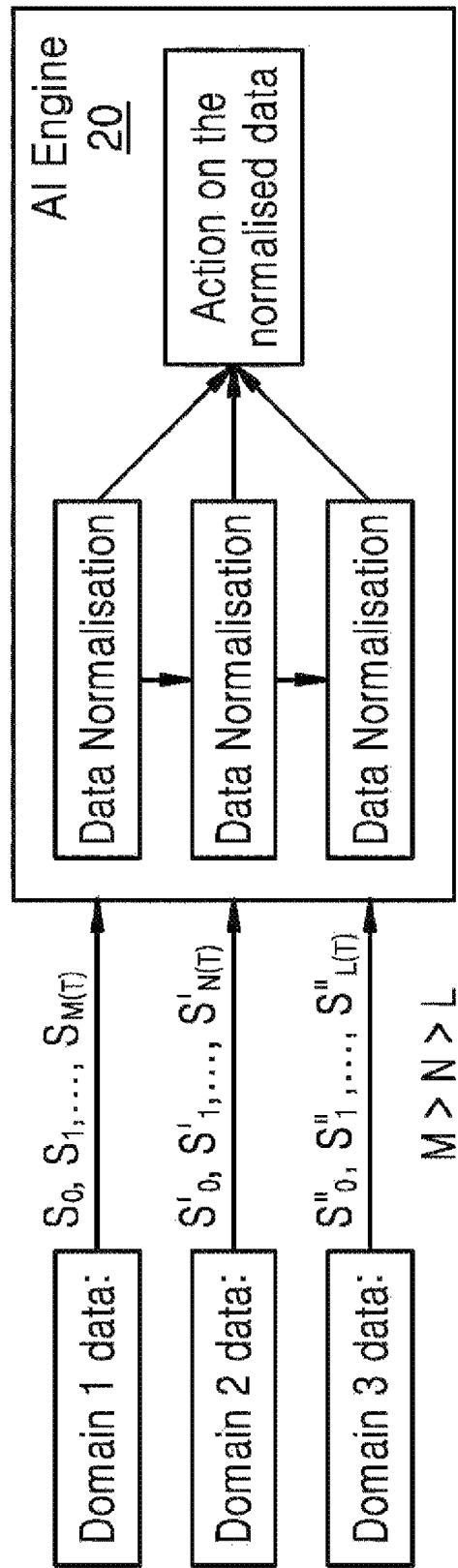
FIG. 2 shows the normalisation of learning data from different domains, according to an embodiment of the present invention.
Figure 3:
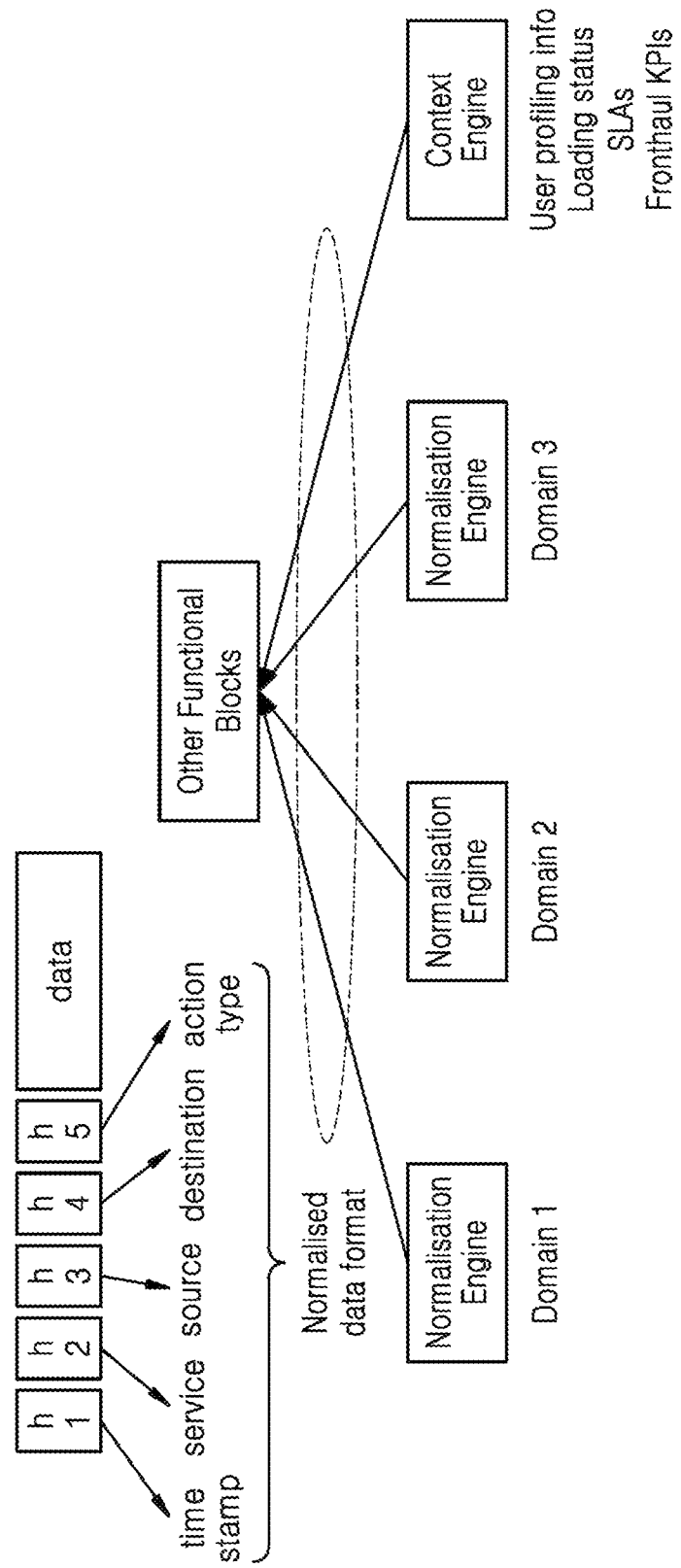
FIG. 3 shows the inter-relation between normalisation and context engines within an intelligent system, according to an embodiment of the present invention.

To address this particular problem, embodiments of the invention provide sampling engines sifting at faster-cycle functions and services to gather the learning data as schematically shown in FIG. 2.

To illustrate this functionality, consider a time duration of T. The data samples collected at Domain 1 (e.g. RAN) are denoted as: S0, S1, . . . , SM(T), where M is the number of samples collected at the Domain 1, and is a function of T. Due to the different time cycles, the data at Domain 2 (e.g. transport network) are usually collected at a reduced time cycle, and are denoted as S'0, S'1, . . . , S'N(T), where N is the number of samples collected at Domain 2.

Similarly, the data collected at Domain 3 (e.g. the Core network) are denoted as S"0, S"1, . . . , SL(T), where L is the number of samples at Domain 3. In the example given above, usually the number of samples M>N>L. This is due to the aforementioned greater degree of activity in Domain 1 than in Domains 2 and 3.

An example of how to normalise the learning data, to be seen by the AI engine as one series of time samples, is illustrated in FIG. 2. This shows the data from Domains 1, 2 and 3 being passed to the AI engine 20.

The normalisation process may be implementation dependent. It may, for example, include up/down sampling, interpolation and pre-processing data to ensure that the data is ready for processing by the other functional blocks within AI Engine.

Up/down sampling in this context can include one or more of padding the data, discarding data items. In the case of padding data, dummy values (possibly equal to preceding or succeeding 'real' data points) may be added so that the number of samples and frequency of occurrence match between different domains. For instance, if in a certain period, a first domain yields two samples valued at 10 and 12. A second domain, in the same time period produces 10 samples. In order to ensure that there are equal numbers of samples for the two domains, then the samples from the first domain may be padded with an extra intermediate set of 8 dummy samples valued at 10 or 12, selected as appropriate.

Alternatively, rather than padding samples from the first domain, samples from the second domain may be discarded to achieve parity of sample rate.

The padding and discard options may be combined, either between two domains, or across multiple domains. In the above example, it may be decided to discard some samples from the second domain to yield 5 samples in the given period and pad the samples from the first domain to also yield 5 samples in the given period.

In the case of e.g. 3 domains, the first and second yield 1 and 10 samples respectively in a given period and the third domain yields more than 10, then samples from the first domain may be padded to match the number yielded in the second domain while samples may be discarded from the third domain to also match the number yielded in the second domain.

Whether a padding, discarding or a mixed strategy is adopted may be determined based on factors such as activity in a particular domain.

The process of data normalisation may also involve turning the samples into first order statistics (e.g. via averaging) or higher order statistics, (e.g. variance of one set of samples or co-variance across multiple sets) to identify correlation between observations in different domains.

In particular, the pre-processing of the data may include the learning and inferencing of the data from one domain, extracting the useful information and knowledge of the data, re-formatting the data according to a unified data format, before passing it to a second domain.

The different processing and sampling mechanisms may be determined according to the different tasks which the AI engine needs to carry out. For example, to accomplish service assurance may need data to be processed with a lower time granularity (longer time cycle) whilst RAN resource optimization has a higher time granularity (shorter time cycle). Such different tasks may be notified to the AI engine by the assisted system.

In order to provide modularised and generalised design of functional blocks for the AI engine 20, it is desirable a) to have a uniform data format for the AI engine to understand and to generalise the other functional blocks in the AI engine; and b) to have a set of interfaces between the existing system and the AI engine to facilitate the normalisation of data.

Having a unified data format ensures that each new functional block (or a cascade of such blocks) can be developed in an independent and modular manner insofar as each block supports the uniform input/output data format. In other words, the exact process performed in each block can be fully abstracted from others as long as they communicate with each other using the same language.

Embodiments of the present invention provide features a) and b) above.

Data Format

A normalised data format is provided by embodiments of the present invention. The data format may contain one or several fields, including: 1) the action requested; 2) the time stamp, 3) the service, 4) the source (reserved); 5) the destination (reserved); 6) the data In the above, "the time stamp" refers to the time that a sample is generated. The time stamp enables the AI engine to effectively collate samples in similar time cycles across different domains. The time stamp uses a common system time to ensure consistency.

"The service" refers to a specific service or task (selected from a source domain or function) that the sample has been taken out of.

"The source" (reserved for a distributed AI engine) field indicates the source of the data collected. In the centralised case, this field indicates the domain where the data is collected. In an NFV network, the source may indicate the ID of a specific VNF. There may be multiple sources, e.g., multiple domains where the data is collected.

"The destination" (reserved for a distributed AI engine) field indicates the destination that the data is to be sent to. In the centralised case, the destination is the AI engine provided in a cloud-based system.

"The action requested" (ENI ACT) field is used by the assisted system 10 to request the intelligent system 20 to perform the desired action for the specific set of data. For example, the assisted system 10 may need the intelligent system 20 to perform network fault prediction, or it may need the intelligent system to make a decision on resource allocation of a slice. It will be understood by a person skilled in the art that different machine learning algorithms may be applied for different actions specified by ENI ACT. It is also understood that different sets of data may need to be collected and different processing of the data in the AI engine is needed, in order to perform a specific ENI ACT.

"The data" field is the actual data collected by the intelligent system 20.

The data collected may be used by the intelligent system 20 to make different set of decisions. The intelligent system 20, depending on the decisions it needs to make, and the context of the network, may decide to use only the data collected from one domain, or from multiple domains.

In the latter case, combination of the collected data samples from the different domains and interpolation may be needed, in order to form the unified data format which will be used by the other functional blocks. It is noted that such a combination process will need again to reformat the data.

Normalisation of data from multiple domains will therefore include: the learning and inferencing of the data from one domain, extracting the useful information and knowledge of the said data, forming the data according to a unified data format, and passing it to a second domain and combining it with data from a second domain. The intelligent system 20 decides whether to pass normalised data to a second domain, according to ENI ACT, and the instructions encoded therein.

The intelligent system 20, in order to perform the requested actions, may need to ask the assisted system 10 to expose more data or APIs to the intelligent system. In other words, more information may be required from the assisted system 10 and this may require the assisted system to open up its data directly or via APIs in order for this to happen.

Figure 4:
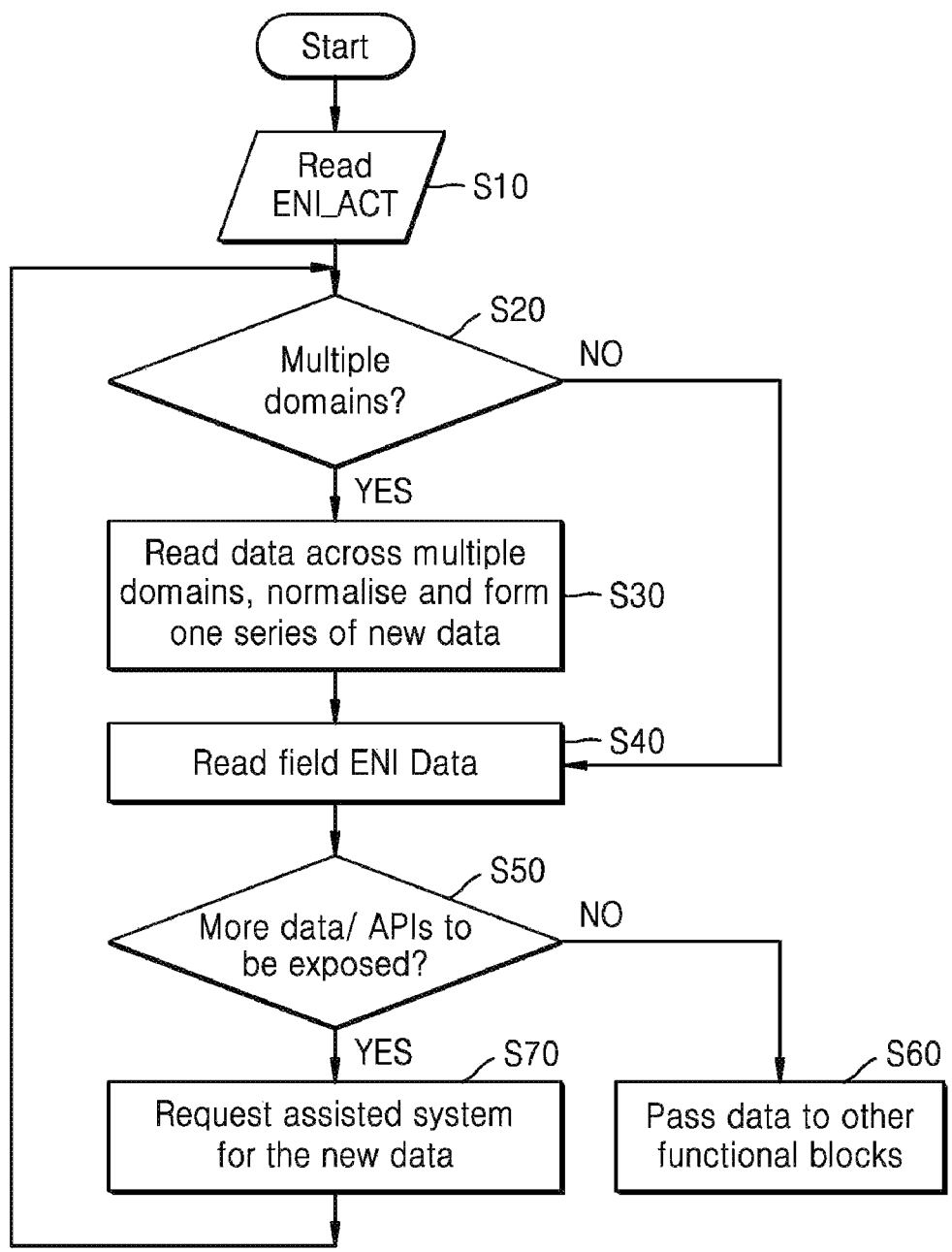
FIG. 4 shows a method according to an embodiment of the present invention.

Procedure of the Intelligent system on the normalised data:

FIG. 4 shows a flowchart detailing actions performed by the intelligent system 20 on the normalised data.

At step S10, the intelligent system reads the field ENI ACT to determine what action is required.

At step S20, it is determined if the action requires data from one domain or multiple domains.

If data is required from only one domain, then flow continues to step S40.

If, however, data is required from multiple domains, then at step S30, data is read across multiple domains, normalised and one series of new data is formed and written to the field of ENI DATA.

At step S40, the ENI DATA field is read. This comprises data from either a single or a multiple domain, depending on the previous steps.

At step S50, a determination is made whether the action requires more data or APIs to be exposed by the assisted system 10. If the answer is YES, then at step S70, a request is made to the assisted system to expose data or APIs and flow returns to step S20 after such data is received. If the answer at step S50 is NO, then at step S60, the data is passed to other functional blocks for further processing.

It is noted the ENI system may also read the context information collected by, e.g., the context aware functional block (hereby referred to as 'context engine'), for the purpose of decision making in the other functional blocks. In certain circumstances, the samples collected per specific domain cannot be effectively clustered to identify patterns (or any changes in them) without identifying the relevant context.

As an example, signal shadowing in a node may result in significant attenuation in signal to interference and noise ratio (SINR) assuming such samples are observed in PHY layer. However, different sources may cause such phenomena, for example another object moving in the vicinity of a node, or change in the direction of movement of a node or even changes in the weather. Such supporting context enables the intelligent system to have a more informed interpretation of events and can assist with subsequent decisions.

An example of such an architectural realisation of this system is shown in FIG. 2.

By use of embodiments of the invention, various advantages are realized. These include:
 a uniform data format throughout the functional blocks of an intelligent system that assists the existing system, to facilitate the modularised and generalised design of the intelligent system;
 the assisted system requests the intelligent system to perform one or multiple intelligent tasks, through a signal ENI ACT;
 ENI ACT may be communicated to the intelligent system via one field of the normalised data to ENI;
 a coherent procedure of data normalisation at the intelligent system to facilitate ease of data processing;
 an agreed protocol operable between the intelligent system and the assisted system for data normalisation, where the intelligent system decides on the data required to perform a given action, and/or the intelligent system requests the assisted system to expose additional data and APIs if needed;
 normalisation of data from multiple domains, including the learning and inferencing of the data from one domain, extracting the useful information and knowledge of the said data, forming the data according to a unified data format and passing it to a second domain and combining it with data from a second domain; and
 the ENI engine is able to decide whether normalised data should be passed to a second domain, according to ENI ACT.

Figure 5:
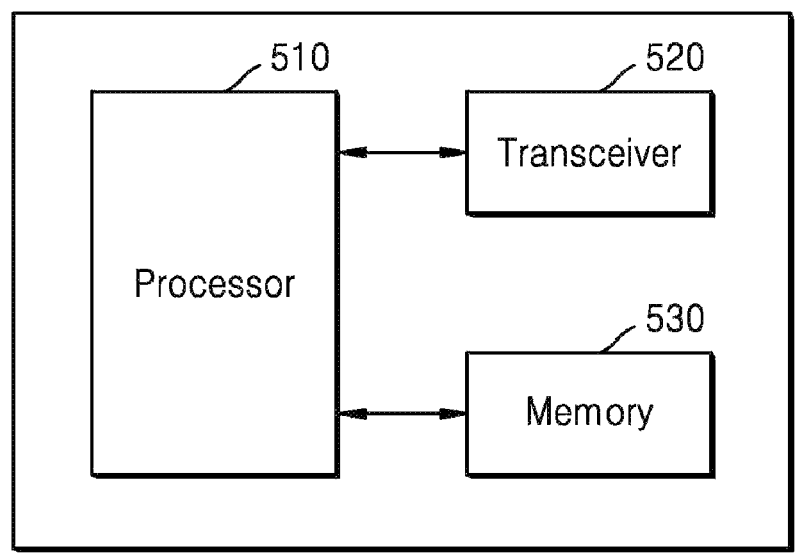
FIG. 5 is a diagram illustrating the AI engine according to an embodiment of the present disclosure.

FIG. 5 is a diagram illustrating the AI engine according to an embodiment of the present disclosure.

Referring to the FIG. 5, the AI engine 500 may include a processor 510, a transceiver 520 and a memory 530. However, all of the illustrated components are not essential. The AI engine 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the AI engine 500 may be implemented by the processor 510.

The processor 510 may control the transceiver to receive data of different domains of an assisted system. The processor 510 may normalise the data of the different domains into a unified format, based on at least one normalisation method corresponding the each of the different domains. The processor 510 may provide the normalised data to an other functional block in the AI engine.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include data of different domains. In addition, the transceiver 520 may receive the signal through a wireless channel and output the signal to the processor 510. The transceiver 520 may transmit a signal output from the processor 510 through the wireless channel.

The memory 530 may store the data of the different domains or normalized data. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

The invention claimed is:

1. A method of normalising data, by an AI (artificial intelligent) engine, the method comprising:
   receiving data of different domains of an assisted system;
   normalising the data of the different domains into a unified format using at least one normalisation method, wherein the at least one normalisation method varies by domains; and
   providing the normalised data to another functional block in the AI engine.

2. The method of claim 1, wherein the normalising comprises:
   learning and inferring data of a specific domain; and
   determining information to be passed for the normalising, from the data of the specific domain.

3. The method of claim 1, wherein the normalising comprises performing a post processing of the data from different domains, and
   the post processing includes a correlation function.

4. The method of claim 1, wherein the normalising comprises:
   performing at least one of up-sampling the data, down-sampling the data or interpolating the data.

5. The method of claim 1, wherein the data is received based on a task required to be performed at the AI engine, and the method further comprises receiving a request of performing the task from the assisted system, in response to the tasks being defined at the assisted system.

6. The method of claim 1, wherein each of the different domains has at least one a specific API or a specific time cycle.

7. The method of claim 1, wherein the different domains include at least one of a RAN (radio access network), a transport or a core.

8. An AI (artificial intelligent) engine of normalising data, the AI engine comprising:

a transceiver; and a processor coupled with the transceiver and configured to:

control the transceiver to receive data of different domains of an assisted system;

normalise the data of the different domains into a unified format using at least one normalisation method, wherein the at least one normalisation method varies by domains; and provide the normalised data to another functional block in the AI engine.

9. The AI engine of claim 8, wherein the processor is further configured to:

learn and infer data of a specific domain, and determine information to be passed for the normalising, from the data of the specific domain.

10. The AI engine of claim 8, wherein the processor is further configured to:

perform a post processing of the data from different domains, and the post processing includes a correlation function.

11. The AI engine of claim 8, wherein the processor is further configured to:

perform at least one of up-sampling the data, down-sampling the data or interpolating the data.

12. The AI engine of claim 8, wherein the data is received based on a task required to be performed at the AI engine, and the processor is further configured to control the transceiver to receive a request of performing the task from the assisted system, in response to the tasks being defined at the assisted system.

13. The AI engine of claim 8, wherein each of the different domains has at least one a specific API or a specific time cycle.

14. The AI engine of claim 8, wherein the different domains include at least one of a RAN (radio access network), a transport or a core.

15. A computer program product comprising a non-transitory computer recording medium that stores a computer program that, when executed by an AI (artificial intelligent) engine, causes the AI engine to:

receive data of different domains of an assisted system;

normalise the data of the different domains into a unified format using at least one normalisation method, wherein the at least one normalisation method varies by domains; and provide the normalised data to another functional block in the AI engine.

* * * * *